Figure 1:
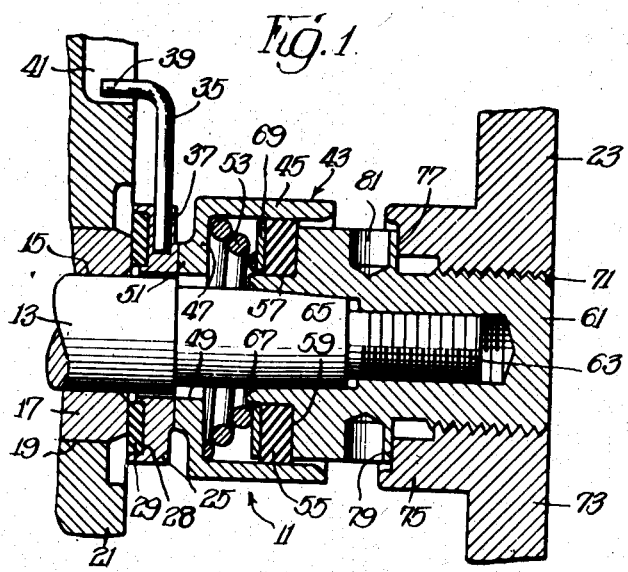

Dec. 22, 1942.    W. W. MEYER    2,305,726
SEAL
Filed July 22, 1940

INVENTOR.
Walter W. Meyer,
BY Junius F. Cook, Jr.

Patented Dec. 22, 1942

2,305,726

UNITED STATES PATENT OFFICE 2,305,726

SEAL

Walter W. Meyer, Arlington Heights, Ill., assignor to Rotary Seal Company, Chicago, Ill., a corporation of Illinois Application July 22, 1940, Serial No. 346,785

2 Claims. (Cl. 286—7)

My invention relates in general to shaft seals and has more particular reference to the provision of means for sealing rotating shafts to prevent the escape of fluids along the shaft past a wall or journal in which the shaft extends.

An important object of the present invention is to provide an improved seal assembly of simplified construction and unusually efficient operating characteristics; a further object being to provide an improved seal seat element for application on the shaft in position to co-operate with the end of the wall or bearing through which the shaft extends in order to provide a perfectly finished seal seat without requiring the end of the bearing or wall itself to be finished for the reception of the seal.

Another important object is to provide an improved seal assembly for use as a replacement unit without requiring the reformation of the shaft, wall, or bearing on which the seal is adapted for use.

Another important object is to provide a seal construction for use outwardly of a casing on the end of a shaft projecting therefrom and carrying a driving coupling, the seal utilizing the coupling as a means for retaining the seal in place.

The foregoing and numerous other important objects, advantages and inherent functions of the invention will become apparent as the same is more fully understood from the following description, which, taken in connection with the accompanying drawing, discloses a preferred embodiment of the invention.

Figure 2:
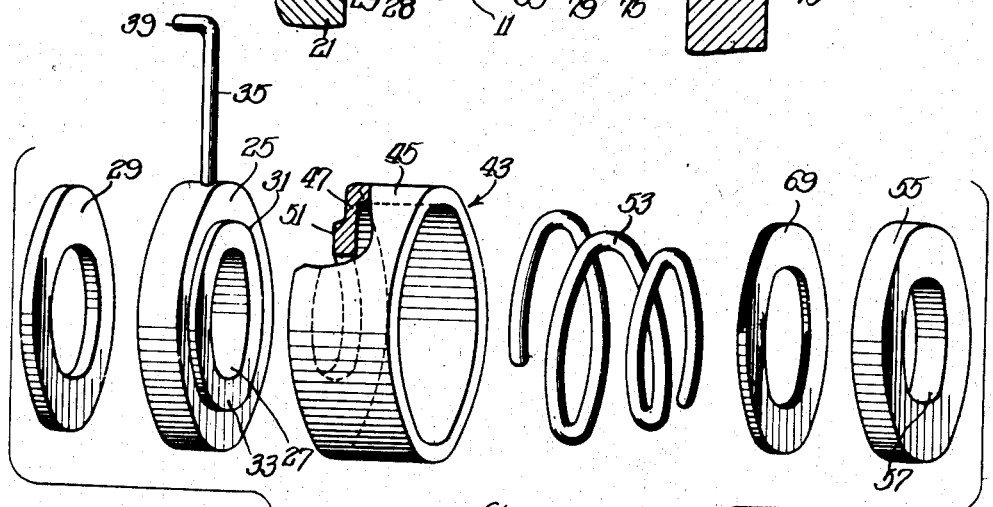
Figure 2:
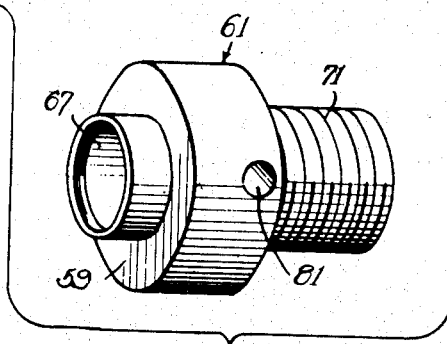

Referring to the drawing:

Figure 1 is a sectional view taken through a shaft fitted with a seal embodying the present invention; and Figure 2 is a perspective view of the several parts forming the seal shown in Figure 1.

To illustrate the invention, I have shown on the drawings a shaft seal assembly 11 for use on a rotating shaft 13 for sealing the same against leakage along the shaft through an opening 15 in a wall through which the shaft extends. In the illustrated embodiment, the opening 15 is defined by a sleeve bearing 17 carrying the shaft and, in turn, supported as by press-fitting in an opening 19 formed in the wall 21 of a casing through which the shaft extends, the shaft outwardly of the casing being formed for connection with a coupling member 23 by means of which the shaft may be constituted as a driving element.

The seal assembly 11 is adapted for use as a replacement unit, and consequently I prefer to form the parts comprising the seal so that they may be applied on the shaft at the end of the bearing 17 without requiring any reformation of the shaft or bearing. To this end, I provide a seal seat element 25 comprising a disk having a central opening 27 of a size to freely receive the projecting end of the shaft adjacent the end of the bearing 17. This disk, on one side, is provided with an annular socket 28 in which is seated an annular gasket 29, preferably of resilient, rubber-like material such as natural or synthetic rubber. The opposite side of the disk 25 is provided with an annular embossment 31 surrounding the opening 27, the surface of this embossment being finished to form a seal seat 33. An anchor pin 35 is fastened on the disk 25 in position projecting radially at the peripheral edge thereof, the anchor pin 35 preferably having an end secured in a socket 37 formed radially in the disk 25, the opposite end of the pin 35 being bent to form an offset latching finger 39. The seat element comprising the disk 25 may be assembled in operating position by passing the same over the outer extremity of the shaft 13, the disk 25 encircling the shaft with the gasket 29 in facing engagement with the end of the bushing 17 and the latching finger 39 engaging the wall 21 in a fashion preventing relative rotation of the member 25 with respect to the end of the bushing 17. This may be accomplished by arranging the finger 39 to engage in any opening, cavity or other socket-forming depression 41 such as commonly found in the walls of casings through which rotating shafts extend; and if a particular housing has no such depression, pocket, or strengthening rib 41, it may be necessary to drill a suitable socket for the reception of the latching finger 39.

The seal assembly 11 also comprises an annular cup-shaped element 43 having annular walls 45 and a bottom 47 formed with an opening 49 adapted to loosely receive the outwardly extending end of the shaft 13, said opening 49 being defined by an embossment 51 formed on the bottom of the element 43. The embossment is finished with a smooth seal surface adapted to co-operate with the surface 33 of the seal seat, whereby to form a running seal between the seat element 25 and the seal element 43. The element 43 may be assembled on the shaft 13 after the seat element 25 has been placed, the cup-shaped element 43 being applied around the shaft with its bottom in engagement with the seat 33.

The cup-shaped element 43 contains a spring 53 preferably of spiral-helical configuration, the spring being of maximum diameter at one end and seating at such end of maximum diameter within the cup-shaped element 43 upon the bottom 47 thereof, the opposite end of the spring, which is of smaller diameter, preferably facing the open end of the cup-shaped member, although, of course, the spring may be arranged in inverted position if desired.

Within the cylindrical walls 45 of the cup-shaped member, I arrange a gasket 55 of resilient, rubber-like material, such as natural or synthetic rubber, said gasket 55 being sized peripherally to tightly fit within the cylindrical walls 45 of the cup-shaped member.

The gasket 55 is formed with a central opening 57 and seats upon an annular shoulder 59 formed in a fitting 61, which is adapted for attachment on the projecting end of the shaft 13.

The projecting end of the shaft 13 is preferably threaded, as at 63, and is preferably tapered, as at 65, inwardly of the threaded portion 63. The fitting 61 comprises a member formed with a socket 67 tapered to fit the tapered portion 65 of the shaft, the bottom of the socket 67 being threaded for attachment on the threaded shaft portion 63 so that the fitting 61, with the gasket 55 applied on the seat 59, may be assembled on the shaft, with the gasket 55 in position within the cylindrical walls of the cup-shaped member 43, merely by applying the fitting 61 upon the projecting end of the shaft and screwing it thereon until the tapered socket 67 wedgingly receives the tapered shaft portion 65. When the fitting and gasket 55 are thus applied, the spring 53 will be placed in compression between the bottom of the cup-shaped member 43 and the sealing gasket 55 on the fitting 61. Preferably a washer 69 is applied in position between the gasket 55 and the spring 53 to protect the gasket against damage through direct engagement with the spring and to equalize spring pressure on the gasket substantially throughout the radial extent of the gasket. The spring functions to thrust the cup-shaped member into engagement with the seat element 25 and to press the seat element upon the end of the bushing 17, thereby compressing the gasket 29 between the bushing and the disk forming the seat element 25 to thereby seal against fluid leakage between the bushing and the seat-forming disk 25. The spring operates also to compress the sealing gasket 55 between the seat 59, the annular walls 45 of the cup-shaped member and the washer 69, thereby sealing against fluid leakage between the fitting 61 and the walls of the cup-shaped member. The rubber-like gasket 55, when compressed, will grip the surfaces of the walls 45 and the surfaces forming the seat 59 to form a driving connection between the shaft and the cup-shaped member, whereby the latter is caused to rotate with the shaft and thus constitute a running seal between the seat element 25 and the seal element 45, the former being held against rotation with respect to the bushing 17 by the latching stem 35, and the latter being driven by the shaft through the sealing gasket 55.

The fitting 61, in addition to its gasket supporting function, may be threaded or otherwise formed, as at 71, for connection with a coupling member 73 by means of which to drivingly connect the shaft with an associated operable device, the coupling 73, in the illustrated embodiment, comprising a plate formed with a threaded opening for receiving the threaded portion of the fitting 61 and an annular spacing portion 75 forming an annular seat 77 for receiving a shoulder 79 formed in the fitting 61 inwardly of the threaded portion 71, so that the coupling may be secured on the fitting and hence on the shaft 31 by screwing the coupling upon the fitting until the seat 77 wedgingly grips the shoulder 79. To facilitate the application of the fitting 61 threadingly upon the shaft 13, it may be formed with peripherally opening sockets 81 for the reception of a turning tool which may be used to tighten the fitting firmly on the projecting end of the shaft.

It will be seen from the foregoing that I have provided an extremely simple seal assembly adapted for application on the projecting end of a shaft without reforming the shaft or the end of the bushing through which it extends, the assembly including a seat-forming element which may be applied in order to form a perfect running seal at the end of the bushing. The assembly also utilizes a part for the purpose of supporting a coupling member on the shaft outwardly of the seal, and since application of the seal to the shaft requires no reformation of the shaft, the seal assembly is particularly well suited for use as a replacement unit.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the form herein disclosed being a preferred embodiment for the purpose of illustrating the invention.

The invention is hereby claimed as follows:

1. A replacement seal for a rotating arbor having an end extending through and outwardly of a wall opening in a casing to be sealed, comprising a washer having a finished annular surface forming a seal seat on one face and an annular flange projecting from the opposite face thereof, a ring of elastic material seated on said opposite face within, and held in place by, said flange, said washer and ring forming a seal seat unit adapted for assembly on the projecting end of the arbor in position with the ring engaging upon the casing wall around the opening through which said arbor extends, and a radial projecting finger on said washer and formed at its extremity for engagement with the wall at a point spaced from said opening to secure the washer against angular movement with respect to the wall.

2. A replacement seal for a rotating arbor having an end extending through and outwardly of a wall opening in a casing to be sealed, comprising a washer having a finished annular surface forming a seal seat on one face and an annular flange projecting from the opposite face thereof, a ring of elastic material seated on said opposite face within, and held in place by, said flange, said washer and ring forming a seal seat unit adapted for assembly on the projecting end of the arbor in position with the ring engaging upon the casing wall around the opening through which said arbor extends, a radial projecting finger on said washer and formed at its extremity for engagement with the wall at a point spaced from said opening to secure the washer against angular movement with respect to the wall, and cooperating seal means on said arbor including a member having an annular seal face and means holding the member with its face in position engaging and forming a running seal with said seal seat.

WALTER W. MEYER.